(12) United States Patent
Ducroquet et al.

(10) Patent No.: US 9,446,658 B2
(45) Date of Patent: Sep. 20, 2016

(54) AGRICULTURAL TRACTOR FRONT END INSTALLATION

(71) Applicant: AGCO SA, Hesston, KS (US)

(72) Inventors: Frederic Ducroquet, Hesston, KS (US); Bruno Sap, Haute Epine (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 15/069,497

(22) Filed: Mar. 14, 2016

(65) Prior Publication Data
US 2016/0193909 A1    Jul. 7, 2016

Related U.S. Application Data

(63) Continuation of application No. 14/365,858, filed as application No. PCT/EP2012/074928 on Dec. 10, 2012.

(51) Int. Cl.
*B60K 11/04* (2006.01)
*B62D 49/00* (2006.01)

(52) U.S. Cl.
CPC ............... *B60K 11/04* (2013.01); *B62D 49/00* (2013.01)

(58) Field of Classification Search
CPC .................................. B60K 1/00; B60K 1/02
See application file for complete search history.

(56) References Cited

U.S. PATENT DOCUMENTS 5,042,604 A * 8/1991 Tone ...................... B60K 11/04
                                                      180/68.4
5,816,350 A * 10/1998 Akira ..................... B60H 1/3227
                                                      180/68.1

* cited by examiner

*Primary Examiner* — John Walters
*Assistant Examiner* — James Triggs

(57) ABSTRACT

An agricultural tractor comprises an engine and a cooling package supported in front of a cab. The cooling package comprises a radiator and fan disposed between the engine and cab, the radiator having a major surface which is aligned longitudinally so that an airflow forced through the radiator by the fan is generally transverse with respect to the tractor's forward direction of travel. The orientation of the radiator provides for a narrower front end installation which improves the driver's field of view and relaxes limitations on steering angles and cooling package size.

8 Claims, 2 Drawing Sheets

AGRICULTURAL TRACTOR FRONT END INSTALLATION

CROSS REFERENCE TO RELATED APPLICATION

This application is a continuation of U.S. patent application Ser. No. 14/365,858 filed Jun. 16, 2014, now U.S. Pat. No. 9,315,097, which is hereby incorporated by reference in its entirety.

BACKGROUND OF THE INVENTION

1. Technical Field

The invention relates to agricultural tractors and in particular to the front end installations of such which includes an engine and a cooling package supported in front of a cab.

2. Description of Related Art

The basic layout of agricultural tractors has not changed for several decades and typically includes a cab supported upon a transaxle which includes a rear axle and a transmission casing as an integrated part. Typically, the engine casing is attached to the front of the transmission via a clutch housing wherein the primary drive shaft runs from the engine to the transmission along a generally central and longitudinal axis.

Other components associated with the engine are housed under a hood together in front of the drivers cab. The most significant of these components is the cooling package which typically includes one or more radiators (or coolers) and a fan for propelling a cooling air stream through the radiators. As with many self-propelled vehicles, the cooling package of known agricultural tractors is disposed forwardly of the engine to have access to an uninterrupted source of clean air through a grill in the front of the hood.

DE-203,10,200-U1 discloses a cooling system having three radiators in a U-configuration with one standing vertically and located at the front of the vehicle and two on respective sides and aligning with a longitudinal axis.

As agricultural machinery increases in size (to benefit from economies of scale), so too does the size of wheeled agricultural tractors required to power that machinery. Currently available models are approaching 400 hp in size. Larger engines demand larger cooling packages and various attempts have been made to accommodate the larger components under the hood whilst minimizing any obstruction to the driver's forward field of vision.

In some countries, safety legislation limits the maximum distance at which the driver's forward field of view begins. Limits on the forward view are determined by the height of the driver's position and the geometry of the hood. These restrictions on the size of the hood limit the size of the cooling package which, in turn, limits the engine size.

Attempts to incorporate larger cooling packages have involved tilting radiators for example. However this has been found to come at the expense of reduced cooling capacity and restricted air flow.

Another drawback of wider front end installations is the reduction in steering capability of the tractor. Wider installations demand a wider supporting frame which in turn limits the angle at which steerable wheels on the front axle can reach.

Yet another drawback of wider front end installations is the restriction placed on the driver's view of a front linkage assembly. Although not fitted to all agricultural tractors, front linkages should be visible to a driver to allow an efficient and safe coupling process. Without a good view of the front linkage lower links a driver is required to repeatedly dismount from the tractor to check the relative tractor/implement position or employ a second person to aid with the attachment.

SUMMARY OF THE INVENTION

It is an object of the invention to provide a front end installation for an agricultural tractor which alleviates the aforementioned problems associated with driver's forward vision and steering capability of the tractor.

In accordance the invention there is provided an agricultural tractor comprising an engine and a cooling package supported in front of a cab, the cooling package comprising a radiator and fan disposed between the engine and cab, the radiator having a major surface which is aligned longitudinally so that an airflow forced through the radiator by the fan is generally transverse with respect to the tractor's forward direction of travel. By turning the radiator through 90 degrees and positioning the radiator between the engine and cab several advantages over known front end installations are delivered.

Firstly, the overall width of the cooling package is reduced. Any increase in the working area of the radiator does not directly affect the width of the front end installation giving increased freedom in design without breaching the aforementioned legislation. In turn, this relaxes the restrictions on engine size as larger cooling packages can be accommodated.

Secondly, the resultant reduction in width provides the driver with improved visibility of any front linkage assembly installed on the vehicle thus improving the efficiency of attaching implements to the front linkage.

Thirdly, the reduced width installation relaxes the physical limitations on the steering angle of the steerable wheels supported on a front axle thus increasing maneuverability of the tractor.

Fourthly, the revised orientation of the cooling package delivers an uninterrupted flow of air through the radiator from one side of the tractor to the other. Moreover, the air warmed by the cooling package is not directed onto the engine as in conventional installations thus improving the cooling efficiency of the package.

Fifthly, the arrangement in accordance with the invention permits the engine to be disposed further in front of the cab and, more importantly, closer to the front axle. Advantageously, this improves the distribution of weight over the two axles thus improving traction and reducing ground compaction from any one wheel.

Preferably, the engine and cooling package are supported on a frame upon which the cab is suspended or fixed. The cab is therefore in a fixed relationship with respect to the cooling package and engine. The frame may include cut-outs in the side to accommodate a steerable wheel supported on a front axle when at full lock. Advantageously, this further increases the freedom of the front wheels to obtain greater steering angles.

The radiator may serve to cool the engine via a coolant which is passed between the engine and radiator in a circuit.

The cooling package preferably comprises a plurality of coolers each having major surfaces which are aligned parallel to one another so as to share a common cooling airflow. As in conventional cooling packages therefore, the cooling package may include a bank of coolers wherein each cooler serves a different function, for example comprising interstage coolers, oil coolers and air conditioning condensers.

The cooling package which includes the radiator and fan may have a width which is less than that of the engine wherein a hood which covers the engine and cooling package has a width which increases from immediately in front of the cab towards the front. Advantageously, this delivers improved visibility of the front wheels for the driver leaving more of the area directly in front of the cab free of obstruction.

The tractor may further comprise a front linkage assembly mounted in front of the engine, the front linkage comprising a pair of lift arms, wherein a direct line of sight is provided between the cab and respective ends of the lift arms.

In a preferred arrangement the agricultural tractor comprises a front axle supporting front steerable wheels, wherein the radiator is disposed behind the front axle.

The fan may operate in a forward and reverse mode to provide an efficient cleaning mechanism wherein collected particulate matter is simply blown from the side of the installation.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

In the following description relative terms such as 'width' transverse' 'longitudinal' 'horizontal' and 'vertical' will be used in relation to the forward direction of travel of the agricultural tractor described. In particular, the term 'longitudinal' equates to a direction parallel to the forward direction of travel. The term 'width' is used as a horizontal measure, perpendicular to a longitudinal axis running through the center of the vehicle.

Figure 1:
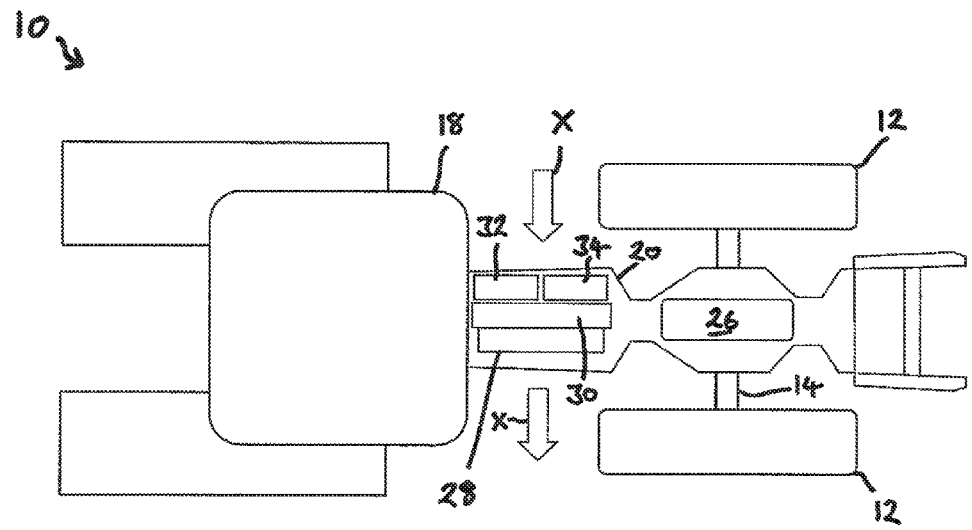
FIG. 1 is a schematic plan view of an agricultural tractor in accordance with invention.
Figure 2:
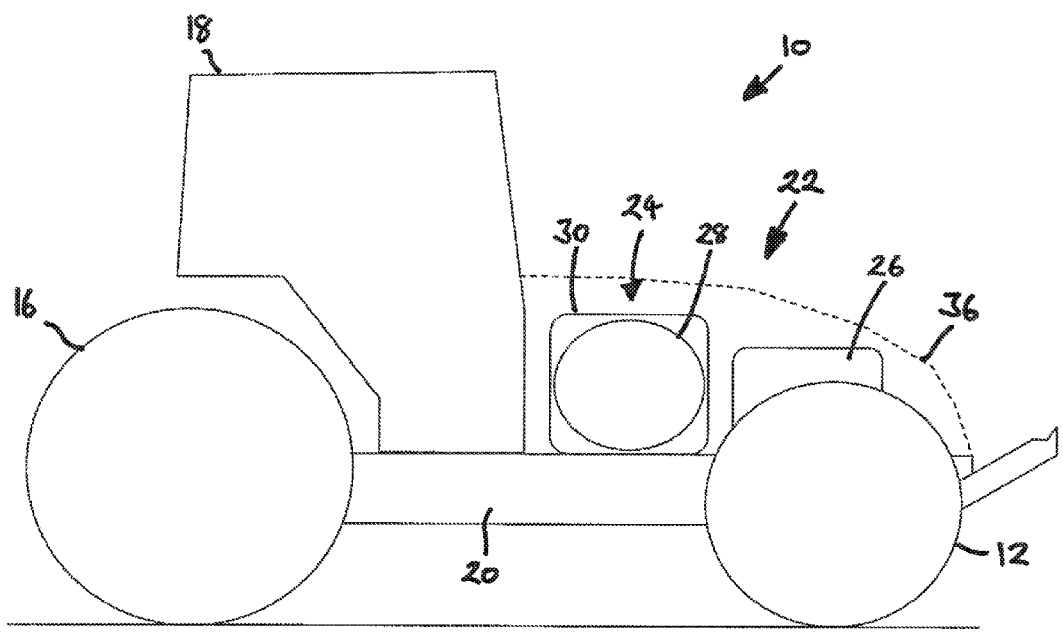
FIG. 2 is a side view of the tractor of FIG. 1.

With reference to FIGS. 1 and 2, an agricultural tractor 10 includes a pair of front steerable wheels 12 supported on a front axle 14 and a pair of rear wheels 16. A driver's cab 18 is supported on top of a frame 20 which is shown in a highly schematic form in the drawings. A front end installation designated generally at 22 includes a cooling package 24 and an engine 26 both supported on the frame 20 in front of the cab 18.

The cooling package 24 is positioned on the frame 20 behind the engine 26 and in front of cab 18. The cooling package 24 comprises a fan with accompanying shroud 28, an engine cooling radiator 30, an air conditioning condenser 32 and an oil cooler 34. The fan 28 is driven electrically or hydraulically and forces a flow of air through the coolers 30, 32, 34 by drawing in air from the left-hand side and propelling the air out of the right-hand side as indicated by arrows X.

Each of the coolers 30, 32, 34 has respective major surfaces which are arranged parallel to one another in longitudinal direction. The airflow therethrough is transverse with respect to the forward direction of travel and is relatively uninterrupted by other components. This is in contrast to convectional front end installations in which the expelled air is typically directed toward the engine and the driver's cabin. The provision of a transverse air flow through the cooling package 24 in accordance with the invention however delivers greater efficiency in cooling and, in particular, improved air conditioning efficiency for the driver's cab.

The engine 26 is positioned in front of the cooling package 24 and over the front axle 14. When compared to conventional agricultural tractors, positioning the engine 26 in this way improves the distribution of weight over the axles thus improving traction and allowing all available power to be exploited.

As can be seen in FIG. 2, the cooling package 24 is higher than the block of engine 26 which allows the covering hood 36 to be angled downwards towards the front thus bringing the limit on the driver's field of view closer to the tractor 10.

Figure 3:
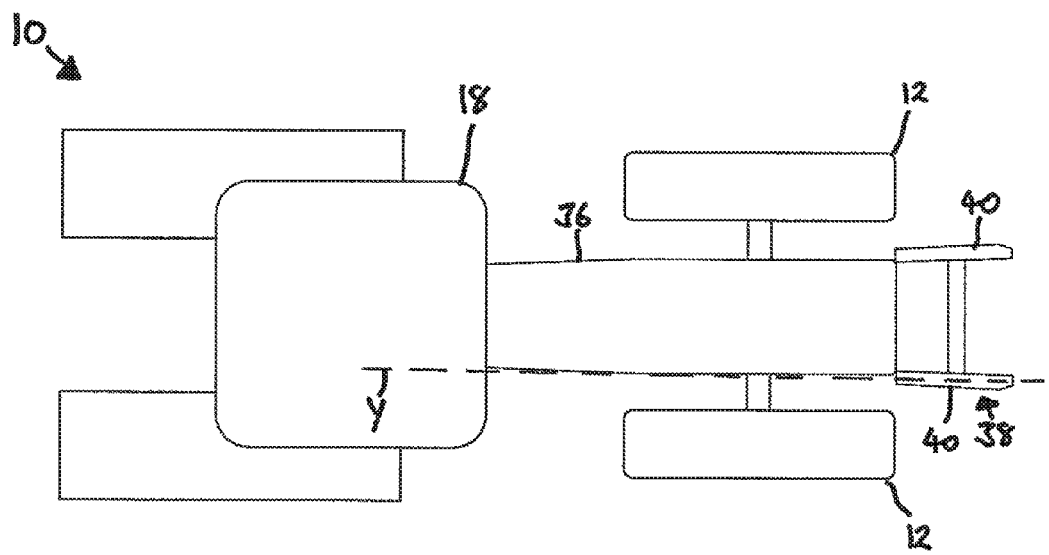
FIG. 3 is a plan view of the tractor of FIG. 1 shown with the hood in place; and, FIG. 4 is a plan view of the tractor of FIG. 1 shown with the steerable wheels at full left-hand lock.

With reference to FIG. 3, a front linkage 38 is fitted to the front end of frame 20 and serves to couple implements to the front of tractor 10. Front linkage 38 includes a pair of lower lift arms 40 for engaging with corresponding attachment points on the implement to be attached. The front end installation 22 with a narrowed profile in accordance with the invention permits a driver seated in cab 18 to view the forwardmost end of lift arms 40 along a line of sight which passes alongside the front end installation as shown by dashed line Y. This improves the efficiency with which a driver can attach a front mounted implement and dispenses with the need to repeatedly alight from the tractor 10 to check the positioning.

Figure 4:
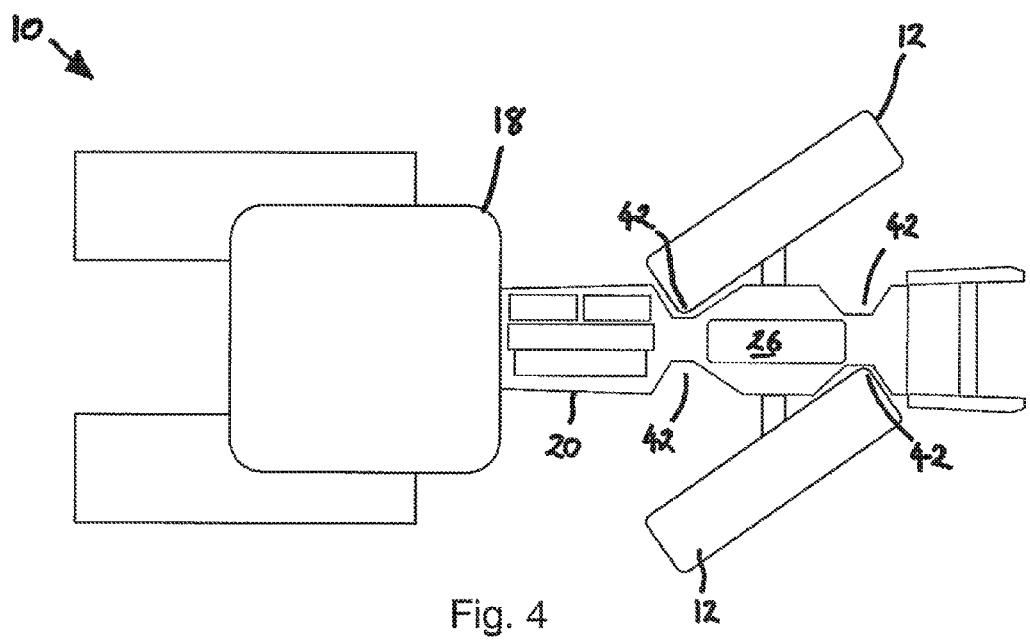

With reference to FIG. 4, frame 20 includes two cut-outs 42 on each side thereof to accommodate the tires of front wheels 12 when at full lock. In FIG. 4 the front wheels 12 are shown at full left-hand lock and it can be seen that the swept envelope of the tires is received in the respective cut-out 42. By the positioning the cooling package behind the engine 26, the cut-outs 42 can be provided conveniently both in front and behind the engine 26.

The front end installation 22 will of course include further components such air filters pipework and electronic controllers, not shown in the drawings. For example, the engine cooling radiator 30 has associated pipework (not shown) which passes coolant between radiator 30 and engine 26 in a circuit. The fitment of such components is within the realms of common practice for persons skilled in the art of engine cooling systems and a detailed description thereof is not necessary for replication of the present invention.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An agricultural tractor comprising an engine and a cooling package supported in front of a cab, the cooling package comprising a radiator and fan, the radiator having a major surface which is aligned longitudinally and the fan having a major surface which is aligned longitudinally so that an airflow forced through the radiator by the fan is generally transverse with respect to the tractor's forward direction of travel, wherein the relative arrangement of components of the cooling package delivers an uninterrupted flow of air through the radiator from one side of the tractor to the other.

2. The agricultural tractor according to claim 1, wherein the engine and cooling package are supported on a frame upon which the cab is suspended or fixed.

3. The agricultural tractor according to claim 1, wherein the radiator serves to cool the engine via a coolant which is passed between the engine and radiator in a circuit.

4. The agricultural tractor according to claim 1, wherein the cooling package comprises a plurality of coolers each having major surfaces which are aligned parallel to one another.

5. The agricultural tractor according to claim 1, wherein the cooling package has a width which is less than that of the engine, and further comprising a hood which covers the engine and cooling package, the hood having a width that increases from immediately in front of the cab towards the front.

6. The agricultural tractor according to claim 1, further comprising a front axle supporting front steerable wheels, the radiator being disposed behind the front axle.

7. The agricultural tractor according to claim 1, wherein the fan operates in a forward and a reverse mode.

8. The agricultural tractor according to claim 1, wherein the radiator and fan are disposed between the engine and cab.

* * * * *